(12) United States Patent
Jones

(10) Patent No.: US 8,275,370 B2
(45) Date of Patent: *Sep. 25, 2012

(54) SYSTEMS AND METHODS FOR SUBSCRIBER PROFILE MANAGEMENT

(75) Inventor: Mark Jones, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,932

(22) Filed: Jan. 31, 2011

(65) Prior Publication Data

US 2011/0124313 A1    May 26, 2011

Related U.S. Application Data

(63) Continuation of application No. 11/526,602, filed on Sep. 26, 2006, now Pat. No. 7,881,699.

(51) Int. Cl.
*H04W 4/00* (2009.01)

(52) U.S. Cl. .............. 455/432.1; 455/432.2; 455/432.3; 455/433; 455/435.1; 455/435.2; 455/410; 455/411; 455/405; 455/406

(58) Field of Classification Search .... 455/432.1–435.3, 455/433, 465.5, 456.1, 410, 411, 405, 406
See application file for complete search history.

(56) References Cited

U.S. PATENT DOCUMENTS

| | | | |
|---|---|---|---|
| 5,905,950 A | 5/1999 | Anell | |
| 5,956,637 A | 9/1999 | Ericsson et al. | |
| 6,021,327 A | 2/2000 | Nguyen et al. | |
| 6,058,301 A | 5/2000 | Daniels | |
| 6,411,807 B1 | 6/2002 | Amin et al. | |
| 6,590,885 B1 | 7/2003 | Jorgensen | |
| 6,658,253 B1 | 12/2003 | Berggren et al. | |
| 6,810,259 B1 * | 10/2004 | Zhang | 455/456.5 |
| 6,990,330 B2 | 1/2006 | Veerepalli et al. | |
| 7,881,699 B2 * | 2/2011 | Jones | 455/411 |
| 2001/0016492 A1 | 8/2001 | Igarashi et al. | |
| 2002/0006133 A1 | 1/2002 | Kakemizu et al. | |

(Continued)

FOREIGN PATENT DOCUMENTS

EP    1 317 159 A1    11/2001

(Continued)

OTHER PUBLICATIONS

Aboba, B., "Review of Roaming Implementations," IETF RFC 2194 Network Working Group, Sep. 1997, pp. 1-35.

(Continued)

*Primary Examiner* — Kamran Afshar
*Assistant Examiner* — Manpreet Matharu
(74) *Attorney, Agent, or Firm* — Zilka-Kotab, PC

(57) ABSTRACT

Systems and methods subscriber profile management to facilitate seamless roaming of mobile devices from one network to another. A subscriber profile management system is provided that includes a time to live ("TTL") generator that generates a TTL limit for a subscriber based on usage characteristics of the subscriber. The subscriber profile management system further includes an administration module that administers TTL limits, TTL limit database that store TTL limits, a subscriber profile database that stores subscriber profiles, a usage measurement database that stores usage measurements, and a TTL limit reference module that administers TTLs when a subscriber profile and TTL limit are transmitted. The invention further includes a series of methods that support seamless roaming capabilities of a subscriber throughout visited networks without the need to continually make proxy calls to re-authenticate a subscriber.

14 Claims, 9 Drawing Sheets

U.S. PATENT DOCUMENTS

| | | |
|---|---|---|
| 2002/0172207 A1 | 11/2002 | Saito et al. |
| 2003/0129991 A1 | 7/2003 | Allison et al. |
| 2004/0073786 A1 | 4/2004 | O'Neill et al. |
| 2005/0101327 A1 | 5/2005 | Nam et al. |
| 2005/0102529 A1 | 5/2005 | Buddhikot et al. |
| 2005/0138179 A1 | 6/2005 | Encarnacio et al. |
| 2005/0143094 A1 | 6/2005 | Reed et al. |
| 2005/0164704 A1 | 7/2005 | Winsor |
| 2005/0166043 A1 | 7/2005 | Zhang et al. |
| 2006/0040664 A1 | 2/2006 | Murray et al. |
| 2006/0077925 A1 | 4/2006 | Rune |
| 2006/0094423 A1 | 5/2006 | Sharma et al. |
| 2006/0160523 A1 | 7/2006 | Erskine et al. |
| 2006/0234676 A1 | 10/2006 | Harris et al. |
| 2007/0127420 A1 | 6/2007 | Tjandra |

FOREIGN PATENT DOCUMENTS

| | | |
|---|---|---|
| JP | 2001 308932 | 11/2000 |
| KP | 10 2004 0024256 | 3/2004 |
| WO | WO 2004004281 | 1/2004 |
| WO | WO 2004079497 | 9/2004 |

OTHER PUBLICATIONS

He, Rui et al., "A Novel Service-Oriented AAA Architecture," the 14th IEEE 2003 International Symposium on Personal, Indoor and Mobile Radio Communication Proceedings, pp. 2833-2837.

Wey et al., "Traffic Impacts of International Roaming on Mobile and Personal Communications with Distributed Data Management," Source Mobile Networks and Applications, vol. 2, No. 4, 1997, pp. 345-356 (Abstract).

International Search Report for PCT/IB2006/004024 dated Sep. 17, 2007, 4 pages.

* cited by examiner

SYSTEMS AND METHODS FOR SUBSCRIBER PROFILE MANAGEMENT

CROSS-REFERENCE TO RELATED APPLICATIONS

This application is a continuation of U.S. patent application Ser. No. 11/526,602, filed on Sep. 26, 2006, entitled "Systems and Methods for Subscriber Profile Management," which is incorporated herein by reference.

BACKGROUND OF THE INVENTION

1. Field of the Invention

The present invention relates to communications, and more particularly, to subscriber profile management.

2. Background of Invention

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. For example, traditional cellular telephone use and mobility continue to grow as the number of cellular subscribers in the United States exceeded 200M for the first time in 2005, with revenues from roaming services (e.g., services used by a cell phone user in a visited network other than their home network) reaching nearly 4B USD. Similarly, an increasing number of wireless Internet access services have been appearing in airports, cafes and book stores with revenue projected from wireless local area network ("LAN") services to exceed 15B USD in 2007.

In a typical wireless Internet environment, Wi-Fi based hotspots could be adjacent or distributed in cellular telephone networks. When the services of wireless LAN and cellular networks are integrated, the mobile node (e.g., laptop computer) can move across networks. There are two types of roaming: roaming between the same type of network (e.g., wireless LAN to wireless LAN or cellular network to cellular network) is defined as horizontal roaming; roaming between different types of networks, such as a wireless LAN and a cellular network, is defined as vertical roaming. In addition to roaming across network providers, a subscriber can roam from one portion of a provider's network to another portion of that same provider's network that is supported by different network elements for controlling access.

The service provider allowing access to its network usually requires a mobile node and/or a mobile user to authenticate that it is entitled to access the network before it is granted network access. Authentication is the process of identifying a device or user. For example, when logging on to a computer network, user authentication is commonly achieved using a username and password. Authentication is distinct from authorization, which is the process of giving devices or individuals access to services and features based on their identity. Authentication merely ensures that an individual is who he or she claims to be, but does not address the access rights of the individual.

Accordingly, a wireless network generally includes many wireless nodes and users trying to gain access to a network. The primary means for controlling access include network access servers ("NAS") and authentication servers. A NAS provides access to the network. A primary authentication server, such as an authentication, authorization, accounting (AAA) server, provides centralized authentication services to a NAS for authenticating client devices before they are granted access to the network. In typical installations, the devices and users are connecting through the NAS to obtain access to a network (e.g., the Internet) via some form of wireless connection. The authentication server is typically a RADIUS (Remote Authentication Dial-In User Service) or Diameter server.

When a mobile subscriber roams between networks or regions of the same network using an AAA server, visited AAA servers are required to make a proxy call to a home AAA server within the mobile subscriber's home network to authenticate the subscriber and retrieve a subscriber profile including access credentials and service profile information. The proxy call is made on every access attempt while the subscriber is roaming even though the subscriber's credentials and service profile is relatively stable in nature. The proxy call increases the latency of the AAA transactions and is susceptible to network failures between the visited and home network regions.

What are needed are cost effective systems and methods for systems and methods to store subscriber profiles in visited AAA servers.

SUMMARY OF THE INVENTION

The present invention provides systems and methods for subscriber profile management to facilitate seamless roaming of mobile devices from one network to another, or across regions of the same network supported by different AAA servers. In an embodiment a subscriber profile management system is provided that includes a time to live ("TTL") generator that generates a TTL limit for a subscriber based on usage characteristics of the subscriber. The subscriber profile management system further includes an administration module that administers TTL limits, TTL limit database that store TTL limits, a subscriber profile database that stores subscriber profiles, a usage measurement database that stores usage measurements, and a TTL limit reference module that administers TTLs when a subscriber profile and TTL limit are transmitted.

The invention further includes a series of methods that support seamless roaming capabilities of a subscriber throughout visited networks without the need to continually make proxy calls to re-authenticate a subscriber.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In particular the present invention is described primarily in the context of a wireless device roaming across networks or across portions of the network of a single service provider. It should, however, be understood that the invention is not limited to only wireless devices. Increasingly, subscribers are relocating wired devices, such as laptop computers, from one network to another in a manner comparable to the roaming of wireless devices. For example, an individual traveling from New York to Los Angeles may take a laptop computer and connect that computer into a different network provider than there home network provider in their hotel room. The present invention is intended to cover these types of non-wireless scenarios, as well, as will be known by individuals skilled in the arts based on the teachings herein.

Additionally, the present invention is described primarily in the context of roaming from a network supported by one network provider to a network supported by a different network provider. It should, however, be understood that the invention is not limited to roaming across networks supported by different network providers. The invention also applies to the scenario where a subscriber travels from one portion of a network supported by a network provider to another portion of a network supported by the same network provider, but in which different network elements (e.g., a AAA server) support access controls for the different portions. As the footprints of network providers continue to grow, they are increasingly regionalizing their networks to have different control network elements supporting the different regions of their networks, thus the importance of this scenario will likely continue to grow.

Figure 1:
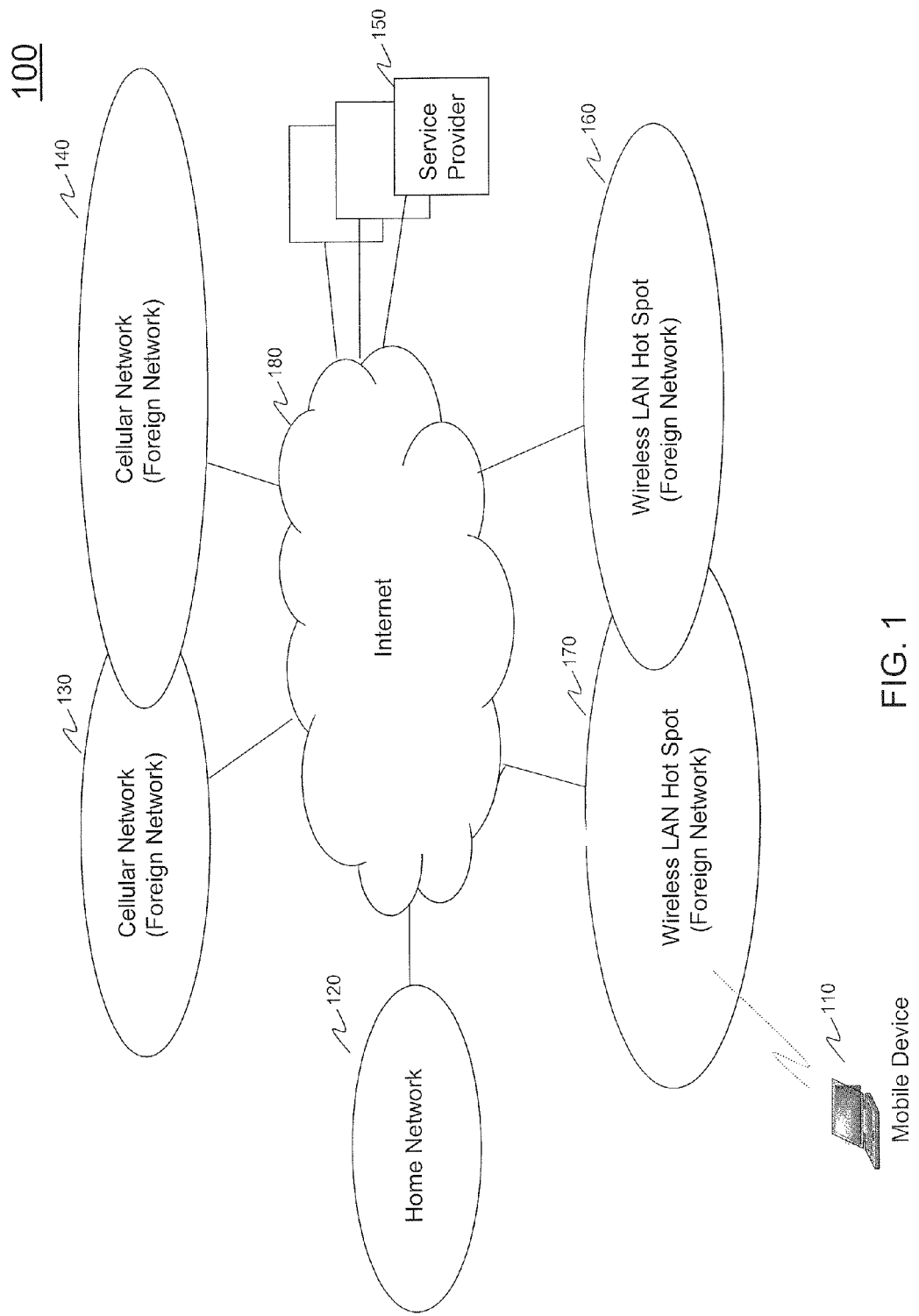
FIG. 1 provides a diagram of a global architecture of the public wireless Internet.

FIG. 1 provides architecture 100 of the public wireless Internet. Architecture 100 includes home network 120, cellular networks 120 and 140, service providers 150, wireless LAN hot spot 160 and 170 and Internet 180. Architecture 100 provides a very simplified diagram of wireless network to illustrate the concepts of a home network and a visited network to highlight the need for authentication procedures. As will be known by individuals skilled in the relevant arts, the present invention can be used on both public and private interconnected wireless networks that require authentication of a mobile device and/or user when that device or user accesses a foreign or visited network that differs from the device or user's home network.

Home network 120 can be any type of wireless network, such as a cellular network or a wireless LAN. Home network 120 represents the home network of mobile device 110. Mobile device 110 can include a laptop computer, a cellular phone, a smart phone, a PDA or other wireless mobile device. Mobile device 110 is shown as currently having a wireless connection to wireless LAN hot spot 170. As will be known by individuals skilled in the relevant arts, mobile device 110 can roam from one network to another, provided that the proper roaming arrangements are in place between network providers and that mobile device 110 can be properly authenticated when entering a visited or foreign network, such as wireless LAN hot spot 170 or cellular network 140. Each of the networks is coupled through Internet 180. Other types of public and private networks can be used to couple the networks.

Figure 2:
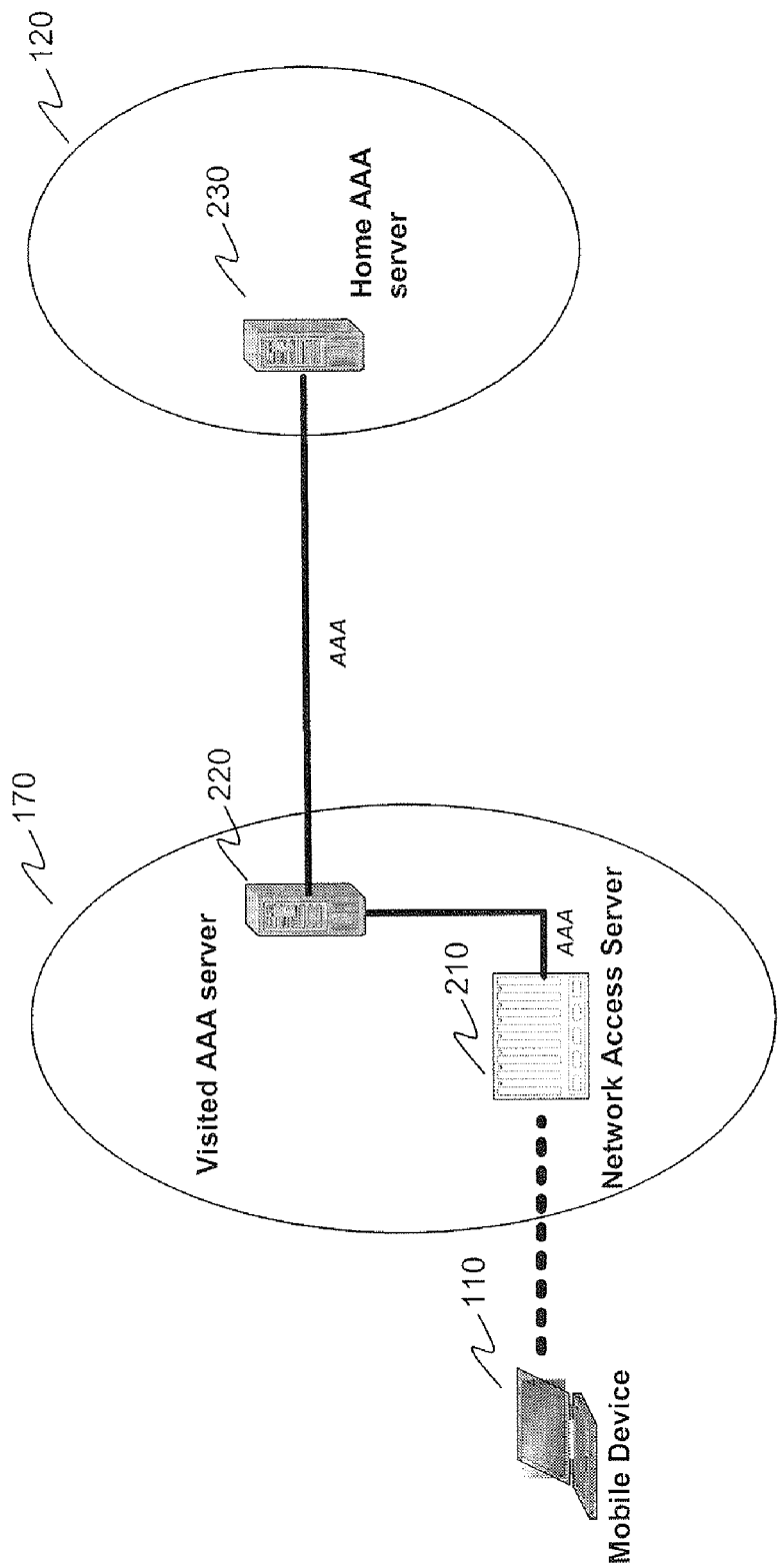
FIG. 2 provides a network diagram of a portion of a roaming environment.

FIG. 2 provides a network diagram of a portion of a roaming environment within the context of architecture 100. The diagram provides a simplified network view that can be used to illustrate the authentication procedures needed when a mobile device roams from one network to another. In the example of FIG. 2, mobile device 110 seeks network access to wireless LAN hot spot 170. Network access server 210 and Visited Authentication, Authorization, Accounting (AAA) server 220 within wireless LAN hot spot 170 support access and authentication of mobile users. Visited AAA server 220 is coupled to home AAA server 230 within mobile device 110's home network 120. For the purposes of authentication, mobile device 110 is wirelessly coupled to network access server 210. Note that when roaming occurs across network providers, some form of trust relationship (e.g., arrangement to support roaming customers) typically exists between network providers, as will be known by individuals skilled in the relevant arts.

Figure 3:
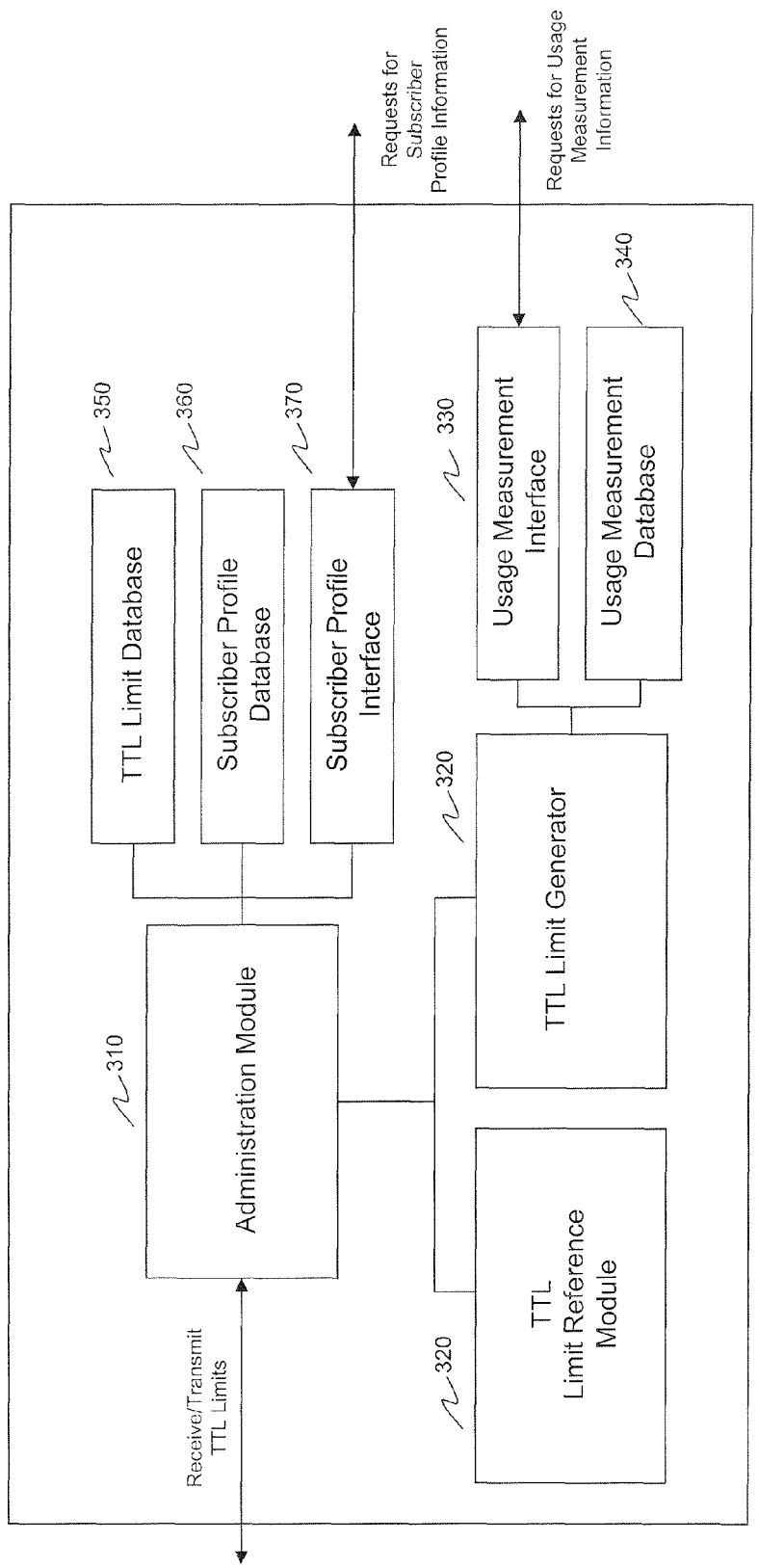
FIG. 3 provides a diagram of subscriber profile manager, according to an embodiment of the invention.

FIG. 3 provides a diagram of subscriber profile manager 300, according to an embodiment of the invention. Subscriber profile manager 300 enables network providers to provide seamless roaming capabilities, while also supporting fraud prevention. Referring to FIG. 2, subscriber profile manager 300 can be included within visited AAA server 220 and home AAA server 230. Subscriber profile manager 300 can also be independently located as an adjunct to a AAA server or within other network elements, as will be known by individuals skilled in the relevant arts based on the teachings herein. Furthermore, while the discussion in the application focuses on network access, the systems and methods described herein can also be applied to application and content access, as will be known by individuals skilled in the relevant arts. The systems and methods are independent of the protocol used to authenticate and authorize the subscriber activity while roaming.

Subscriber profiles includes both subscriber credentials and subscriber service profiles. A subscriber credential includes an identify and something only the subscriber would know (e.g., a password or private key in a public-key cryptography.) Common identifiers for wired and wireless data networks are, for example, a network access identifier and a mobile station international ISDN number. An example of a network access identifier is jdoe@aol.com. An example of a mobile station number is +1 613 555-5555. A subscriber service profile contains the parameters required to deliver a service to a subscriber according to the subscriber's service subscription. Examples of service profile parameters include the allowed time of service delivery, video/audio codec to be used, and upload/download speeds.

Subscriber profile manager 300 includes administration module 310, TTL limit reference module 320, TTL limit generator 320, usage measurement 330, usage measurement database 340, TTL limit database 350, subscriber profile database 360 and subscriber profile interface 370.

Administration module 310 manages overall operation of subscriber profile manager 300 and serves multiple functions. When subscriber profile manager 300 supports a home AAA server, such as home AAA server 230, administration module 310 provides subscriber profiles and TTL limits when they are requested by a visited network of a subscriber to home network 120. Upon receiving a request to provide a subscriber profile and TTL limit, administration module 310 gathers the needed information from TTL limit database 350 and subscriber profile database 360 or through subscriber profile interface 370.

Prior to gathering the requested information, administration module 310 confirms that the subscriber has the right to access services within the visited network. In particular, administration module 310 determines how many existing roaming sessions the particular subscriber has available by accessing TTL limit reference module 320 to determine the number of active sessions and whether those sessions exceed a roaming session threshold for the subscriber.

Roaming session thresholds identify the number of open roaming sessions that a particular customer may have. For example, a customer may be permitted to have a total of three roaming sessions open in any particular time frame. This would allow a customer, for example, to log on to a network provider of a Wi-Fi hotspot at an airport. The customer could then travel to a hotel and log on to another network provider in the hotel lobby. Finally, the customer could then use a Wi-Fi hotspot provided by a different network provider at the local Starbucks without re-establishing a subscriber profile each time the customer logged on and off of the same network provider or logged on and off different portions of a network using different access control elements within a network provided by the same network provider. The customer could move freely through these different visited networks without the need to continually request their subscriber profile each time that they logged back into one of the visited networks. Factors used to determined the roaming session threshold would include the known mobility characteristics of the subscriber, the type of service of the subscriber and other factors related to, but not limited to, fraud control.

When administration module 310 transmits a subscriber profile and TTL limit to another network, administration module 310 records the event in TTL limit reference module 320. In an embodiment, administration module 310 would record the subscriber ID, the TTL limit or simply that the limit is active and the transmit start time. When the time elapsed from the transmit start time reaches the TTL limit, TTL limit reference module 320 deactivates the particular TTL session by either deleting the entry or simply noting that it is inactive. In further embodiments the TTL limit reference module 320 can also record a visited network ID and a service ID for the particular session. Using this information, subscriber profile manager 300 can provide more sophisticated fraud control and more detailed statistical information for monitoring relationships with network providers and content providers. In a further embodiment, administration module 310 can also identify when a subscriber profile changes. When a subscriber profile changes, administration module 310 can determine whether any TTL are active for the subscriber and determine whether to provide an update to the networks where an active TTL exists for the subscriber.

When subscriber profile manager 300 supports a home AAA server, such as home AAA server 230, administration module 310 also generates and stores TTL limits for subscribers. When creating a TTL limit for a subscriber, administration module 310 requests TTL limit generator 320 to generate a TTL limit. In an embodiment, TTL limit generator 320 either access usage measurement from usage measurement database 340 or requests usage measurement interface 330 to gather usage measurement information from a remote database to generate a TTL limit.

TTL limit generator 320 analyzes the received usage and billing information data to derive a TTL limit and a roaming session threshold for a subscriber based on a set of TTL rules. Factors that may be considered can include, but are not limited to, the type of subscription the customer, whether the customer regularly pays their bill in a timely manner, the mobility characteristics of the customer (e.g., do they travel often or move around frequently from visited network to visited network, or through different portions of a network operated by a single network provider, and the like). Upon generating the TTL limit and roaming session threshold, TTL limit generator 320 provides this information to administration module 310. Administration module 310 then stores the information in TTL limit database 350 with a pointer or link to the appropriate subscriber profile.

When subscriber profile manager 300 supports a visited AAA server, upon receiving a service request from a subscriber administration module 310 confirms that a valid profile and active TTL exists or transmits a request to obtain them. In this mode of operation, TTL limit database 350 includes a listing of the active visiting subscribers and their TTL limits. When a service request is received, administration module 310 confirms whether an active TTL limit with a corresponding subscriber profile exists for the subscriber. If one exists administration module 310 provides a notification to an AAA server that access should be permitted. If one does not exist, administration module 310 provides a notification to an AAA server to request a TTL limit and subscriber profile before permitting access.

When administration module 310 receives a TTL limit and subscriber profile for a visiting subscriber, administration module 310 records the TTL limit in TTL limit database 350 and places the profile in subscriber profile DB 360. Additionally, administration module 310 records a receive start time for the TTL. When the time elapsed from the receive start time exceeds the TTL limit the, TTL limit and subscriber ID are deactivated, such that, the start up procedures to provide an updated TTL limit and subscriber profile from the home network of the subscriber would need to be provided.

Figure 4:
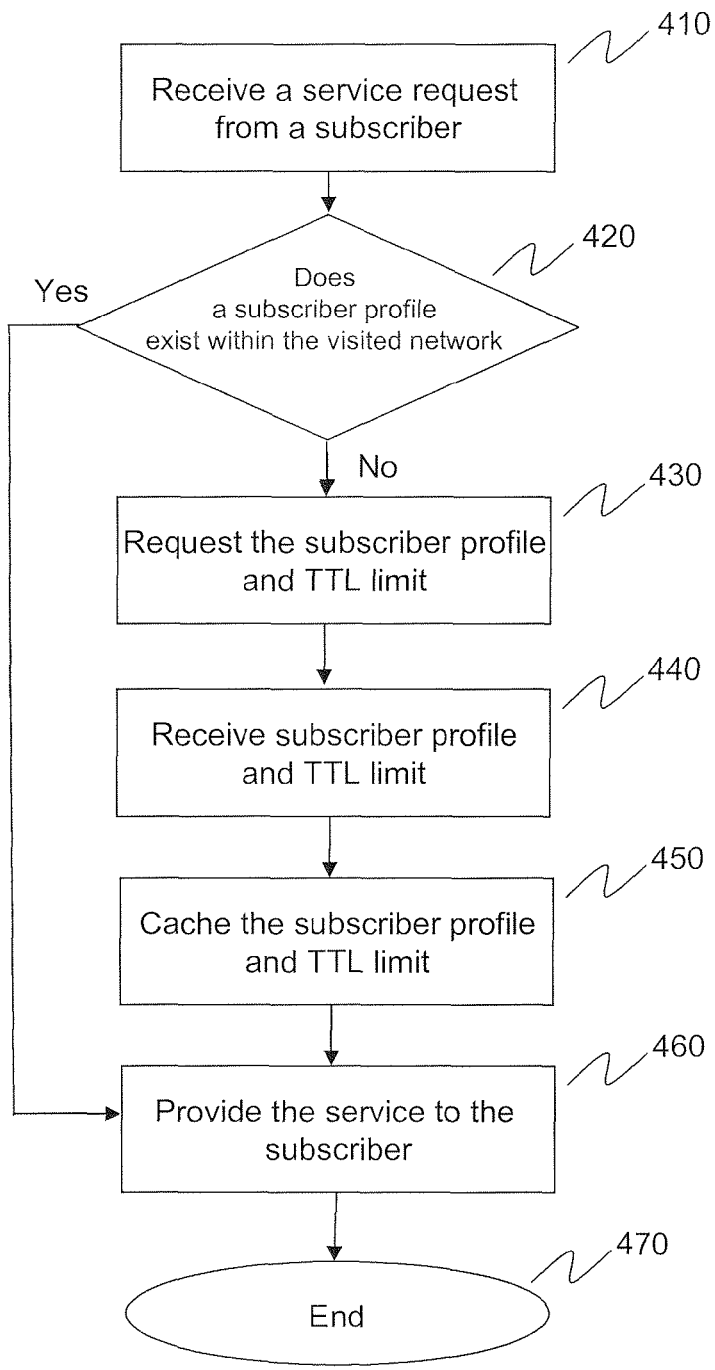
FIG. 4 provides a method for a visited network to provide a service to a subscriber having a home network, according to an embodiment of the invention.

FIG. 4 provides a method 400 for a visited network to provide a service to a subscriber having a home network, according to an embodiment of the invention. For the purpose of illustration and not by way of limitation, the network configuration provided in FIG. 2 will be used to explain the steps of Methods 400 and 500. In the network configuration of FIG. 2, mobile device 110 is attempting to access service from wireless LAN hot spot 170 having network access server 210 and visited AAA server 220. Mobile device 110's home network is home network 120, having home AAA server 230. Subscriber profile manager 300 is located within visited AAA server 220.

Method 400 begins in step 410. In step 410 a service request from a subscriber in a visited network service area is received. For example, administration module 310 can receive a service request from mobile device 110 trying to access wireless LAN hot spot 170.

In step 420 a determination is made whether a subscriber profile and an active TTL limit exists for the subscriber. For example, administration module 310 can poll TTL limit database 350 to determine if a TTL limit is active for mobile device 110. If a TTL limit is active for the particular subscriber, then method 400 proceeds to step 460. Otherwise, method 400 proceeds to step 430.

When an active TTL limit does not exist for a subscriber, in step 430 a subscriber profile and TTL limit are requested. As discussed above with reference to FIG. 3, the TTL limit is based on the subscriber's usage characteristics. In an embodiment, administration module 310 transmits a request for the subscriber profile and TTL limit. Visited AAA server 220 transmits the request to home AAA server 230.

In step 440 a subscriber profile and TTL limit are received. For example, administration module 310 receives a subscriber profile and a TTL limit that was received from home AAA server 230.

In step 450 the subscriber profile and TTL limit are cached. For example, the subscriber profile can be stored in subscriber profile database 360 or in a database external to subscriber profile manager 300, with a link to the external source stored in subscriber profile database 360. Similarly, the TTL limit is cached in TTL limit database 350. When caching the TTL limit and subscriber profile, a start time is set by administration module 310.

In step 460 service is provided to the subscriber. For example, network access server 210 can provide service authorization to mobile device 110 and mobile device 110 can begin to use the services of wireless LAN hot spot 170. In step 470 method 400 ends.

In a further embodiment, updates to a subscriber profile can be transmitted while the subscriber has active TTLs. For example, administration module 310 can identify when a subscriber profile changes. When a subscriber profile changes, administration module 310 can determine whether any TTLs are active for the subscriber and determine whether to provide an update to the networks where an active TTL exists for the subscriber. Administration module 310 can then provide the updated profile to the network locations where the TTL for that subscriber is active.

Figure 5:
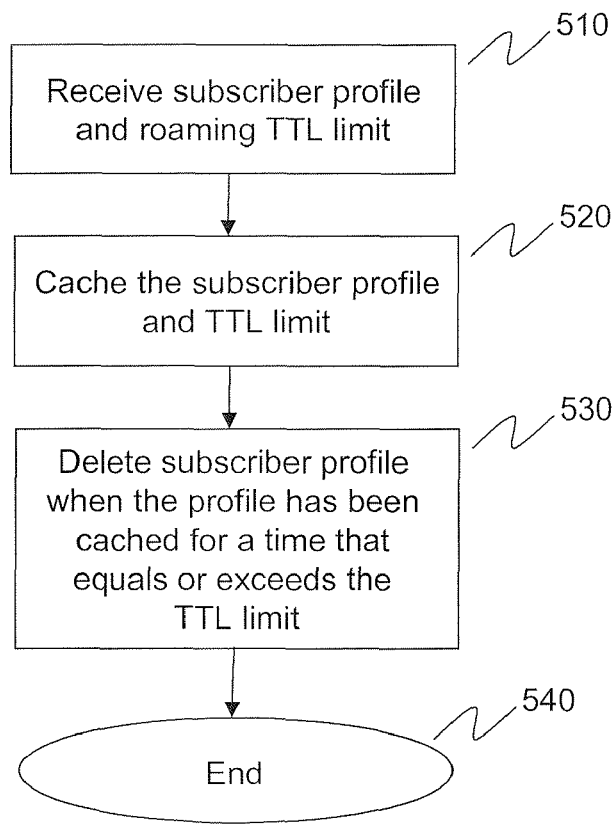
FIG. 5 provides a method for a visited network to administer a subscriber profile and TTL limit for a subscriber having a home network, according to an embodiment of the invention.

FIG. 5 provides a method 500 for a visited network to administer a subscriber profile and TTL limit for a subscriber having a home network, according to an embodiment of the invention. Method 500 begins in step 510. In step 510 a subscriber profile and TTL limit are received. For example, administration module 310 receives a subscriber profile and a TTL limit that was received from home AAA server 230.

In step 520 the subscriber profile and TTL limit are cached. For example, the subscriber profile can be stored in subscriber profile database 360 or in a database external to subscriber profile manager 300, with a link to the external source stored in subscriber profile database 360. Similarly, the TTL limit is cached in TTL limit database 350. When caching the TTL limit and subscriber profile, a start time is set by administration module 310.

In step 530 a determination is made that the elapsed time from the start time to activate the TTL has been equaled or exceeded. The subscriber profile and corresponding TTL are deactivated. In an embodiment the subscriber profile and TTL are deactivated by deleting them from the TTL limit database 350 and subscriber profile database 360. In an alternative embodiment, they are deactivated by signifying that the TTL limit is not active without deleting the TTL limit and subscriber profile. In method 540 method 500 ends.

Figure 6:
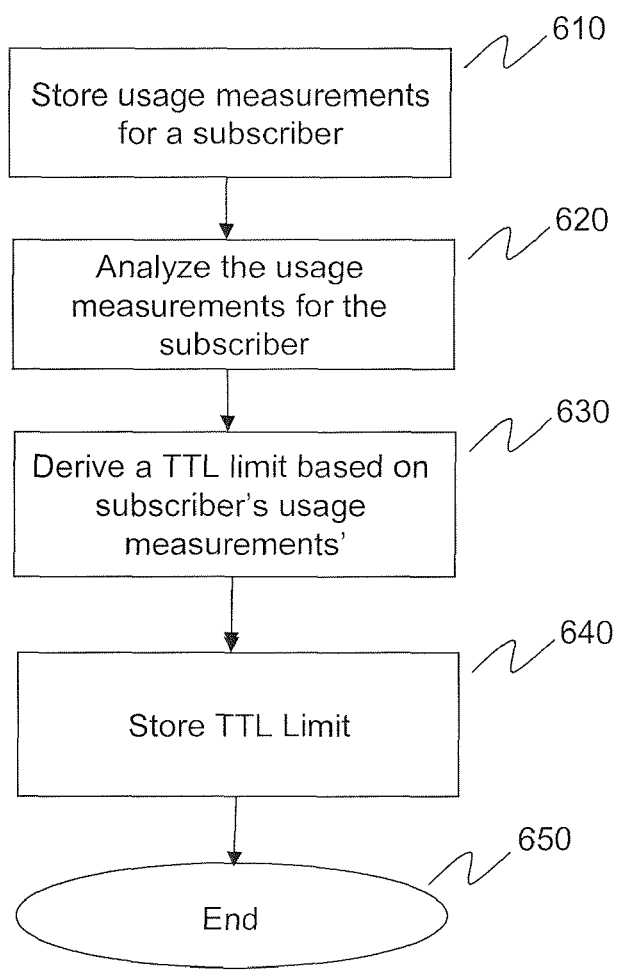
FIG. 6 provides a method for deriving a roaming TTL limit for a subscriber, according to an embodiment of the invention.

FIG. 6 provides a method for deriving a roaming TTL limit for a subscriber, according to an embodiment of the invention. For the purpose of illustration and not by way of limitation, the network configuration provided in FIG. 2 will be used to explain the steps of Methods 600 and 700. In the network configuration of FIG. 2, mobile device 110 is attempting to access service from wireless LAN hot spot 170 having network access server 210 and visited AAA server 220. Mobile device 110's home network is home network 120, having home AAA server 230. Subscriber profile manager 300 is located within home AAA server 230.

Method 600 begins in step 610. In step 610 usage measurements for a subscriber are stored. In an embodiment usage measurements for mobile device 110 are stored in either usage measurement database 340 or into a usage measurement database that is external to subscriber profile manager 300.

In an embodiment usage measurements include usage measurements typically required to generate invoices for a customers. For example, within a cellular network these would include location of call origination, location of call termination, time and day of call, duration of call and other usage measurements that will be known to individuals skilled in the art. Usage measurements may also include the locations of where a roaming subscriber accesses a visited network, e.g., Starbuck's at 110 American Way, Washington, D.C. 20005. Usage measurements can also include records of the types of services or content accessed. Usage measurements can also include services and products purchased online and from whom.

In step 630 a TTL limit is derived based on the subscriber's usage measurements. The TTL limit can be derived in a multitude of ways. For example, the TTL limit could be set equal to the average time a subscriber spends accessing visited network at any given time. The TTL limit can be set equal to the maximum time a subscriber spends accessing a visited network. The TTL's can be visited network specific, such that when a request is provided for a TTL, the TTL associated with the network requesting the information can be provided on a subscriber by subscriber basis. The TTL limit can be derived based on a combination of usages statistics, as discussed above, combined with the type of service a subscriber has. For example, if a subscriber has a high priced service, their TTL's might be a multiplier. Furthermore, if a subscriber has a history of not paying their bills in a timely manner their TTL's may be reduced.

In an optional feature, a roaming session threshold value can be derived by a customer. The roaming session threshold is equal to the number of active roaming sessions that will be permitted for a particular customer. Thus, a customer with a history of significant roaming may receive a high roaming session threshold. Or a customer with a high priced service might also receive a high roaming session threshold.

In step 640 the TTL limit and optionally the roaming session threshold are stored. For example, the TTL limit and roaming session threshold can be stored in TTL limit database 350. In step 650 method 600 ends.

Figure 7:
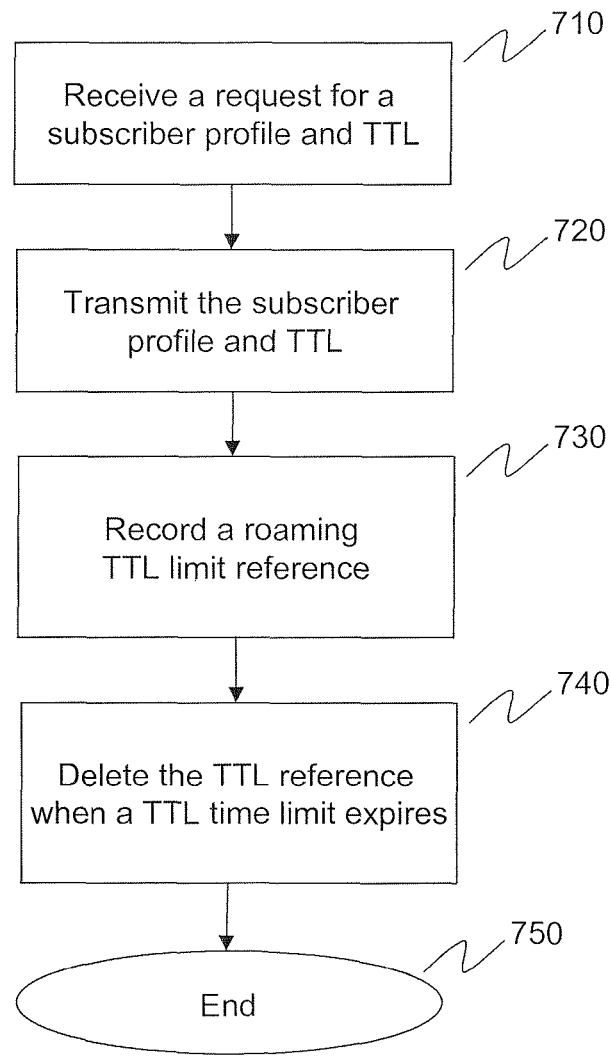
FIG. 7 provides a method for a home network of a subscriber to administer TTL limits for the subscriber, according to an embodiment of the invention.

FIG. 7 provides a method 700 for a home network of a subscriber to administer TTL limits for the subscriber, according to an embodiment of the invention. Method 700 begins in step 710. In step 710 a request for a subscriber profile and TTL is received. For example, subscriber profile manager 300 can receive a subscriber profile and TTL request from visited AAA server 220, when mobile device 110 attempts to access wireless LAN hot spot 170.

In step 720 a subscriber profile and TTL are transmitted. For example, subscriber profile manager 300 located within home AAA server 230 can transmit the subscriber profile and TTL to visited AAA server 220. Prior to transmitting the subscriber profile and TTL, optionally a determination is made whether the subscriber exceeds the roaming session threshold. If the roaming session threshold has been exceeded, home AAA server 230 sends a message that instructed visited AAA server 220 to deny service with an explanation of the reason for denial.

In step 730 a TTL limit reference is recorded. For example, administration module 310 can record that a TTL was transmitted for mobile device 110 into TTL limit reference module 320. A time is also recorded when the TTL was transmitted.

In step 740 the TTL limit reference is deleted when the elapsed time exceeds the TTL limit. In step 750 method 700 ends.

Figure 8:
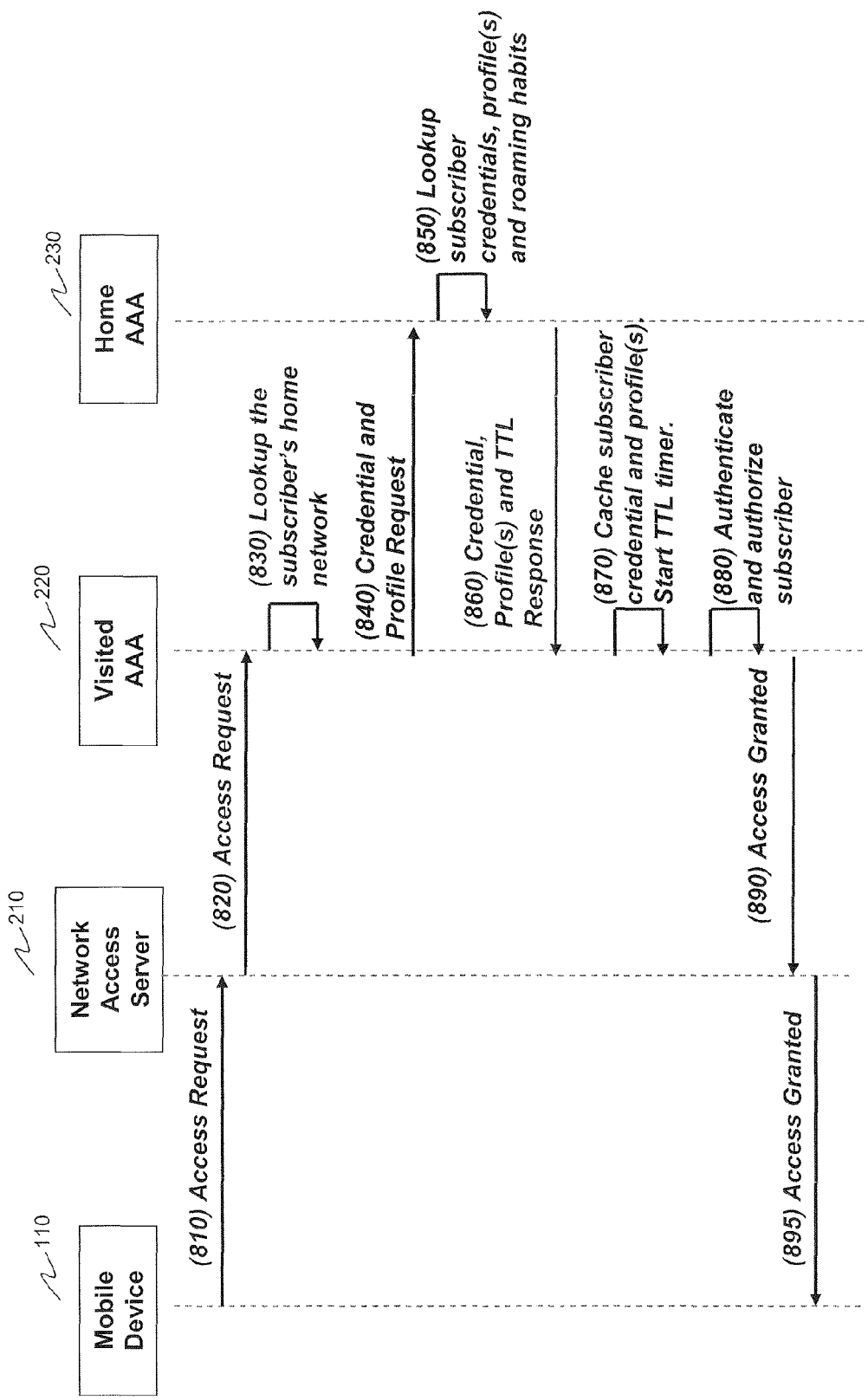
FIG. 8 provides an end-to-end service establishment diagram, according to an embodiment of the invention.

FIG. 8 provides an end-to-end service establishment diagram, according to an embodiment of the invention. The service establishment diagram illustrates the sequence of events that occur when mobile device 100 requests access to service from wireless LAN hot spot 170. In step 810, mobile device 100 sends an access request message to network access server 210. In step 820 network access server 210 sends an access request message to visited AAA server 220. In step 830 visited AAA server 220 looks up the subscriber's home network. In step 840 visited AAA server 220 requests the profile for the subscriber from home AAA server 230.

In step 850 home AAA server 230 looks up the subscriber profile and roaming habits, including the TTL limit. In step 860 home AAA server transmits the subscriber's profile and TTL to visited AAA server 220. In step 870 visited AAA server caches the subscriber profile and TTL limit. A TTL timer is started to measure elapsed time. In step 880 visited AAA server authenticates and authorizes the subscriber. In step 890 visited AAA server 220 transmits a message to network access server 210 to grant access to the service. In step 895 network access server 210 transmits an access granted message to mobile device 110, and a service connection is established.

Computer System Implementation

Figure 9:
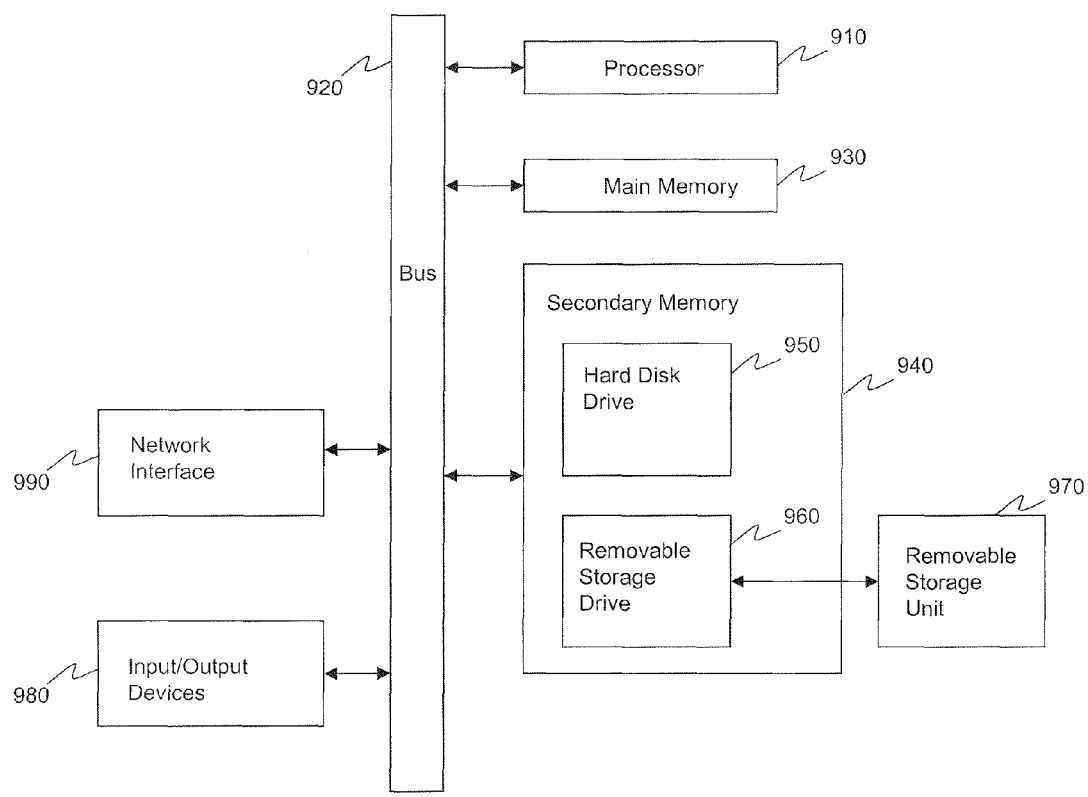
FIG. 9 is a diagram of a computer system on which the methods and systems herein described can be implemented, according to an embodiment of the invention.

In an embodiment of the present invention, the methods and systems of the present invention described herein are implemented using well known computers, such as a computer 900 shown in FIG. 9. The computer 900 can be any commercially available and well known computer or server capable of performing the functions described herein, such as computers available from International Business Machines, Apple, Sun, HP, Dell, Cray, etc.

Computer 900 includes one or more processors (also called central processing units, or CPUs), such as processor 910. Processor 900 is connected to communication bus 920. Computer 900 also includes a main or primary memory 930, preferably random access memory (RAM). Primary memory 930 has stored therein control logic (computer software), and data.

Computer 900 may also include one or more secondary storage devices 940. Secondary storage devices 940 include, for example, hard disk drive 950 and/or removable storage device or drive 960. Removable storage drive 960 represents a floppy disk drive, a magnetic tape drive, a compact disk drive, an optical storage device, tape backup, ZIP drive, JAZZ drive, etc.

Removable storage drive 960 interacts with removable storage unit 970. As will be appreciated, removable storage unit 960 includes a computer usable or readable storage medium having stored therein computer software (control logic) and/or data. Removable storage drive 960 reads from and/or writes to the removable storage unit 970 in a well known manner.

Removable storage unit 970, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 900, or multiple computer 900s to perform any combination of the functions described herein Computer programs (also called computer control logic) are stored in main memory 930 and/or the secondary storage devices 940. Such computer programs, when executed, direct computer 900 to perform the functions of the present invention as discussed herein. In particular, the computer programs, when executed, enable processor 910 to perform the functions of the present invention. Accordingly, such computer programs represent controllers of the computer 900.

Computer 900 also includes input/output/display devices 980, such as monitors, keyboards, pointing devices, etc.

Computer 900 further includes a communication or network interface 990. Network interface 990 enables computer 900 to communicate with remote devices. For example, network interface 990 allows computer 900 to communicate over communication networks, such as LANs, WANs, the Internet, etc. Network interface 990 may interface with remote sites or networks via wired and/or wireless connections. Computer 900 receives data and/or computer programs via network interface 990. The electrical/magnetic signals having contained therein data and/or computer programs received or transmitted by the computer 900 via interface 990 also represent computer program product(s).

The invention can work with software, hardware, and operating system implementations other than those described herein. Any software, hardware, and operating system implementations suitable for performing the functions described herein can be used.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A subscriber profile management system in a wireless home network, comprising:
a time to live (TTL) generator that generates a TTL limit for a subscriber based on usage characteristics of the subscriber, wherein the TTL limit specifies a time limit for which a subscriber profile is to remain active within a visited network when the subscriber accesses the visited network;
an administration module that administers the TTL limit;

a TTL Limit Reference Module that stores and administers the TTL limit when the subscriber profile and the TTL limit are transmitted to the visited network for the subscriber;

a usage measurement interface that provides an interface to an external source that provides subscriber usage measurements;

wherein the subscriber profile management system transmits the subscriber profile and the TTL limit when a service request is received from the visited network for the subscriber having the wireless home network different from the visited network, wherein the subscriber profile management system is located within the wireless home network;

wherein the subscriber profile management system generates and manages the TTL limit for the subscriber of the wireless home network.

2. The subscriber profile management system of claim 1, further comprising a TTL limit database that stores the TTL limit.

3. The subscriber profile management system of claim 1, further comprising a subscriber profile database that stores the subscriber profile, wherein the subscriber profile includes subscriber credentials and a subscriber service profile.

4. The subscriber profile management system of claim 1, further comprising a subscriber profile interface that provides an interface to an external source that provides the subscriber profile.

5. The subscriber profile management system of claim 1, further comprising a usage measurement database that stores subscriber usage measurements.

6. The subscriber profile management system of claim 1, wherein the usage characteristics include roaming characteristics.

7. A wireless home network system, comprising:
a TTL limit database that stores a TTL limit for a visiting subscriber when the visiting subscriber has been granted network access to a visited network, wherein the TTL limit specifies a time limit for which a subscriber profile is to remain active within the visited network when the visiting subscriber accesses the visited network;

a subscriber profile database that stores the subscriber profile when the visiting subscriber has been granted network access to the visited network;

an administration module that administers the subscriber profile and the TTL limit, wherein the visiting subscriber is from a home network that differs from a network in which the system resides; and a TTL Limit Reference Module that stores and administers the TTL limit when the subscriber profile and the TTL limit are transmitted to the visited network for the subscriber.

8. The system of claim 7, wherein upon receiving a service request the system determines whether an active TTL exists for the visiting subscriber requesting service.

9. The system of claim 8, wherein when the active TTL limit does not exist for the visiting subscriber requesting service, the system requests the subscriber profile and the TTL limit from the home network of the visiting subscriber.

10. The system of claim 7, wherein the TTL limit is based on one or more of usage characteristics of the visiting subscriber, billing characteristics of the visiting subscriber, a type of subscription for the visiting subscriber, bill payment characteristics of the visiting subscriber, mobility characteristics of the visiting subscriber and fraud control parameters.

11. A method in a visited wireless network, comprising:
receiving a service request from a visiting subscriber in a service area of a visited network;

requesting a visiting subscriber profile and a time to live (TTL) limit, wherein the TTL limit specifies a time limit for which the visiting subscriber profile is to remain active within the visited network when the visiting subscriber accesses the visited network;

receiving the visited subscriber profile and the TTL limit;
caching the visiting subscriber profile and the TTL limit; and
providing the service to the visiting subscriber;
storing and administering the TTL limit when the visiting subscriber profile and the TTL limit are transmitted to the visited network for the visiting subscriber.

12. The method of claim 11, further comprising recording a roaming start time.

13. The method of claim 12, further comprising deactivating the TTL limit when an elapsed time from the roaming start time exceeds the TTL limit.

14. The method of claim 11 wherein the visited network and a home network are operated by the same network provider.

* * * * *